United States Patent [19]
Furuta et al.

[11] Patent Number: 6,049,654
[45] Date of Patent: *Apr. 11, 2000

[54] RECORDING MEDIUM PLAYING APPARATUS FOR REPRODUCING SAME TIME INFORMATION GROUP

[75] Inventors: Yoshiki Furuta; Hiroyuki Hirano; Sumio Hosaka; Atsushi Kimura; Hiroshi Horii, all of Tokorozawa, Japan

[73] Assignee: Pioneer Electronic Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/824,439

[22] Filed: Mar. 26, 1997

[30] Foreign Application Priority Data

Mar. 29, 1996 [JP] Japan .................................. 8-103403

[51] Int. Cl.⁷ .............................. H04N 5/91; H04N 5/781
[52] U.S. Cl. .............................................. 386/95; 386/126
[58] Field of Search .............................. 386/45, 108, 125, 386/126, 95, 102, 106; 360/27, 69; 369/275.3; H04N 5/781, 5/92

[56] References Cited

U.S. PATENT DOCUMENTS

| | | | |
|---|---|---|---|
| 4,656,535 | 4/1987 | Usui | 360/27 |
| 4,787,073 | 11/1988 | Masaki | 360/69 |
| 4,949,322 | 8/1990 | Kimura et al. | 360/69 |
| 5,430,553 | 7/1995 | Misono et al. | 386/106 |
| 5,611,693 | 3/1997 | Chaya et al. | 386/102 |
| 5,619,338 | 4/1997 | Nakai et al. | 386/70 |
| 5,630,006 | 5/1997 | Hirayama et al. | 386/95 |
| 5,636,200 | 6/1997 | Taira et al. | 369/275.3 |
| 5,652,824 | 7/1997 | Hirayama et al. | 386/95 |

*Primary Examiner*—Wendy Garber
*Assistant Examiner*—Luong Nguyen
*Attorney, Agent, or Firm*—Fish & Richardson P.C.

[57] ABSTRACT

A recording medium playing apparatus allows an arbitrary and easy selection and reproduction of each information piece of a recording medium carrying a plurality of information pieces which variously represent a scene on the same time axis position during reproduction of information. In the recording medium playing apparatus for playing a recording medium on which same-time information groups each formed by a plurality of information pieces of the same time position are recorded, reproducing means for reproducing information of the recording medium reproduces information of the recording medium by arbitrarily selecting each information piece of the recording medium based on a command for reproducing each same-time information group.

9 Claims, 7 Drawing Sheets

FIG.3

| DISK IDENTIFICATION INFORMATION | ANGLE BLOCK | ANGLE BLOCK START ADDRESS | SELECTED ANGLE |
|---|---|---|---|
| a | A | 43972 | II |
|   | B | 44108 | IV |
|   | C | 63910 | I |
|   | D | 69858 | II |
|   | E | 73885 | III |
|   | F | 80254 | III |
|   | G | 96412 | I |

RECORDING MEDIUM PLAYING APPARATUS FOR REPRODUCING SAME TIME INFORMATION GROUP

BACKGROUND OF THE INVENTION

1. Field of the Invention

The present invention relates to a recording medium playing apparatus, and more particularly to a recording medium playing apparatus arbitrarily selecting for reproduction each information piece of a recording medium in which a plurality of information pieces, capable of variously representing a scene in the same time axis position during reproduction of information, are recorded.

2. Description of Background Information

Optical disk players for reproducing sound information or image information recorded on an optical recording disk or the like are known. In an optical disk, information is recorded, as represented by movie software or picture viewing (enjoying) software, in such a way that image information is recorded in association with sound information, and formed as a collection of information pieces which is divided into still pictures or moving pictures having predetermined time length. Each information piece is recorded together with a corresponding frame number or chapter number, so that each information piece is identified.

As the information pieces are recorded on the optical disk described above, along a time axis for reproducing the scenes, in a normal playback operation all of the information pieces are reproduced by an optical disk player. Depending on the cases, the optical disk is played after an order of reproduction of the information pieces is programmed and stored by using the frame number or the chapter number.

In recent years, on the other hand, it is contemplated to prepare, as recording information of an optical disk, images which are taken from different directions (angles) or images of different scenes as images of the same time, and to record the images in parallel with each other. For instance, if a baseball game is recorded on an optical disk, a plurality of information pieces representing images of a scene such as a home-run scene which forms a point of the game, taken from various directions, for instance, from behind the pitcher or from behind the catcher, are recorded in parallel, and optical disks of this sort are the examples.

However, if an optical disk of this sort is played in a conventional optical disk player, all of the image or scenes of the same time which are recorded in parallel will be reproduced consecutively. In the case of the reproduction of the baseball game which is mentioned above, it will be, for example, necessary to previously select all of information pieces corresponding to a predetermined direction, and to program and store the reproduction order so that other information pieces corresponding to images or scenes of the same time will not be reproduced. Furthermore, if a user wishes to reproduce the images at a different direction after having programmed a reproduction operation corresponding to the predetermined direction, the user is required to repeat the programming each time. Thus, with conventional optical disk players, user has been burdened with the necessity of performing a number of manipulating steps.

OBJECT AND SUMMARY OF THE INVENTION

The present invention was made in view of the problem with the conventional playing apparatus described above, and it is an objective of the present invention to provide a recording medium playing apparatus which allows an arbitrary and easy selection of information pieces of a recording medium in which recorded are a plurality of information pieces variously representing a scene at a same time point on the time axis of the reproduction of information, and reproduces the selected information pieces.

According to the first aspect of the invention, in a recording medium playing apparatus for playing a recording medium on which at least a same-time information group formed by a plurality of information pieces of a same time is recorded, has reproducing means for reproducing information recorded on the recording medium, memory means for storing specifying data for specifying a selected information piece for each of the same-time information group, and the apparatus reproduces information of the recording medium based on said specifying data stored in said memory means.

According to the second aspect of the invention, the recording medium playing apparatus according to the first aspect of the invention further comprises detection means for detecting the same-time information group, and the apparatus reproduces the information of the recording medium based on the specifying data stored in the memory means when the same-time information group is detected by the detection means.

According to the third aspect of the invention, the recording medium playing apparatus according to the first aspect of the invention further comprises setting means for setting an order of reproduction of information pieces recorded on the recording medium, and the setting means is operative to set an information piece to be reproduced in the same-time information group, based on the specifying data stored in the memory means.

According to the fourth aspect of the invention, in the recording medium playing apparatus according to one of the first to third aspect of the invention, information recorded on said recording medium is image information, and information pieces included in said same-time information group are image information pieces obtained by shooting or representing a same object at a plurality of angles.

According to the fifth aspect of the invention, in the recording medium playing apparatus according to one of the first to fourth aspect of the invention, the memory means stores an identification information piece recorded on the recording medium and the specifying data in the form of a pair, and the apparatus further comprises a comparing means for comparing an identification information piece retrieved from said recording medium with the identification information piece stored in said memory means, wherein the apparatus reproduces information of the recording medium based on the specifying data stored in a pair including the identification information when a coincidence between the identification information pieces is detected by the comparing means.

According to the sixth aspect of the invention, a recording medium playing apparatus for playing a recording medium on which at least a same-time information group formed by a plurality of information pieces of a same time position is recorded, comprises reproducing means for reproducing information recorded on said recording medium, and selecting means for randomly selecting an information piece of said same-time information group, wherein the apparatus reproduces an information piece selected by the selecting means when reproducing the same-time informtion group.

According to the seventh aspect of the invention, the information recording medium playing apparatus according to the sixth aspect of the invention, further comprises detection means for detecting said same-time information group, wherein the apparatus reproduces the information piece selected by the selecting means when the same-time information group is detected by the detection means.

According to the eighth aspect of the invention, in information recording medium playing apparatus according to the sixth aspect of the invention, further comprising setting means for setting an order of reproduction of information pieces recorded on the recording medium, and the setting means is operative to set the information piece selected by the selecting means as an information piece to be reproduced in the same-time information group.

According to the ninth aspect of the invention, in the recording medium playing apparatus according to one of the sixth through eighth aspect of the invention, information recorded on said recording medium is image information, and information pieces included in said same-time information group are image information pieces obtained by shooting or representing a same object at a plurality of angles.

According to the tenth aspect of the invention, a recording medium playing apparatus for playing a recording medium on which same-time information groups each formed by a plurality of information pieces of a same time are recorded, comprises reproducing means for reproducing information recorded on the recording medium, input means for entering a command for reproducing all of the same-time information groups, and control means for controlling said reproducing means for controlling the reproducing means to reproduce, when reproducing each of the same-time information groups, an information piece included in each of the same-time information groups if the command has not been entered, and to reproduce, when reproducing each of said same-time information groups, all of the information pieces included in each of the same-time information groups if the command has been entered.

As the playing apparatus according to the present invention is configured as described above, the memory means stores information of information piece selected for each same-time information group by specifying it by using specifying data, and the reproducing means reproduces the information of the recording medium based on the specifying data stored in the memory means. By this feature, the selection operation is facilitated for selecting information pieces of the recording medium carrying a number of information pieces variously representing a scene at the same time in the time axis during reproduction of the information.

By employing a selecting means for randomly selecting the information pieces, a random-selection reproduction of information pieces of the same-time information groups is easily performed at the the of reproduction of the information of the recording medium.

Furthermore, by arbitrarily entering a command to reproduce all of the same-time information groups by using an input means, the control means performs control operations that an information piece included in the same-time information group is reproduced at the time of reproduction of the same-time information group if the command has not been entered, and all of the information pieces included in the same-time information group are reproduced at the time of reproduction of the same-time information group if the command has been entered. By this operation, the operation for selective reproduction of the information pieces of the same-time information group is facilitated.

DETAILED DESCRIPTION OF PREFERRED EMBODIMENTS

Hereinafter, the recording medium playing apparatus according to the first to fifth aspect of the present invention will be described by way of the first embodiment.

Figure 1:
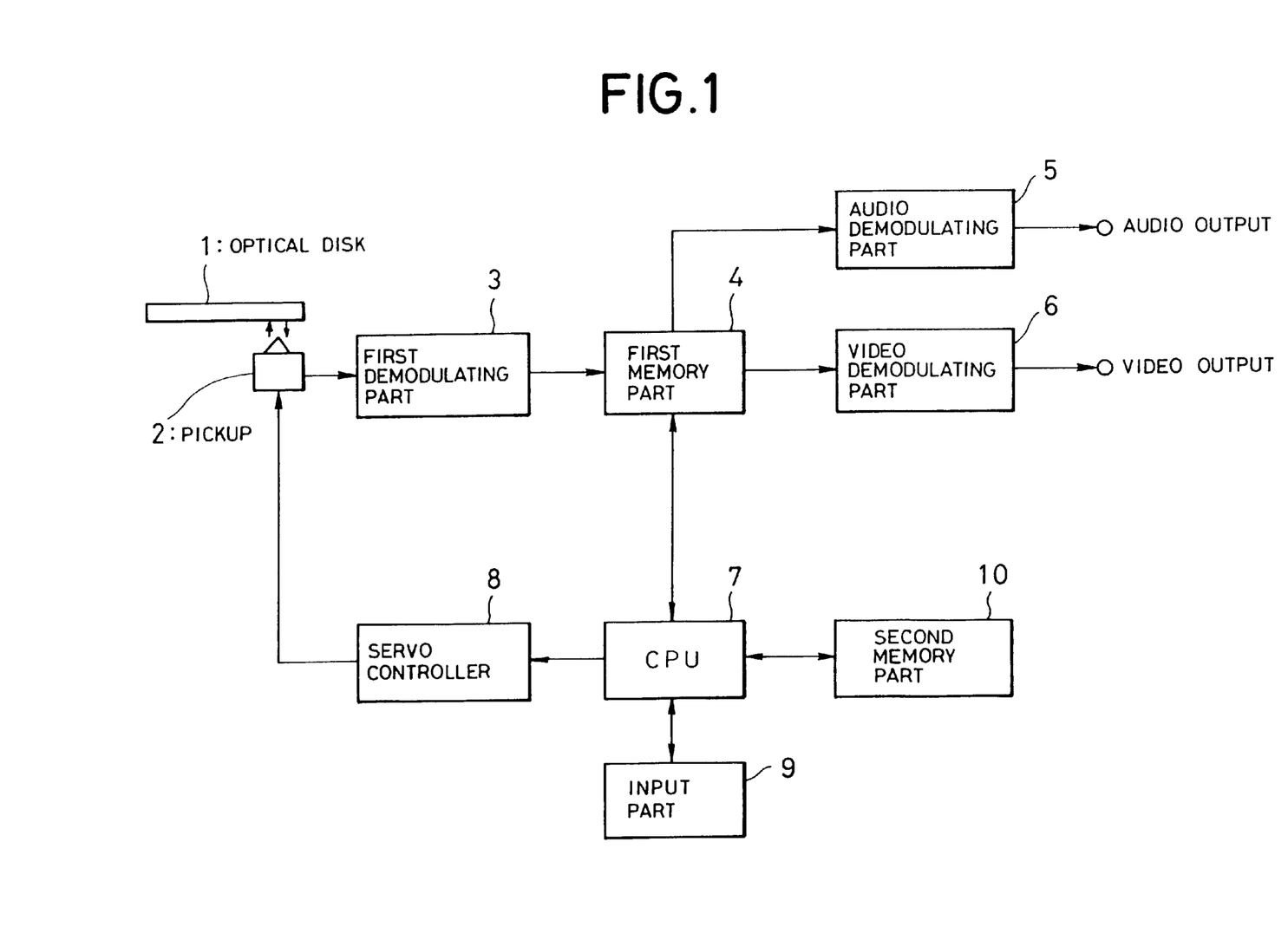
FIG. 1 is a block diagram schematically showing major parts of a first embodiment of the recording medium playing apparatus according to the present invention.

FIG. 1 is a block diagram schematically showing major parts of the first embodiment of the recording medium playing apparatus according to the first to fifth aspect of the present invention.

In the figure, the reference numeral 1 denotes an optical disk which is suited for use in a recording medium playing apparatus according to the present invention.

Figure 2:
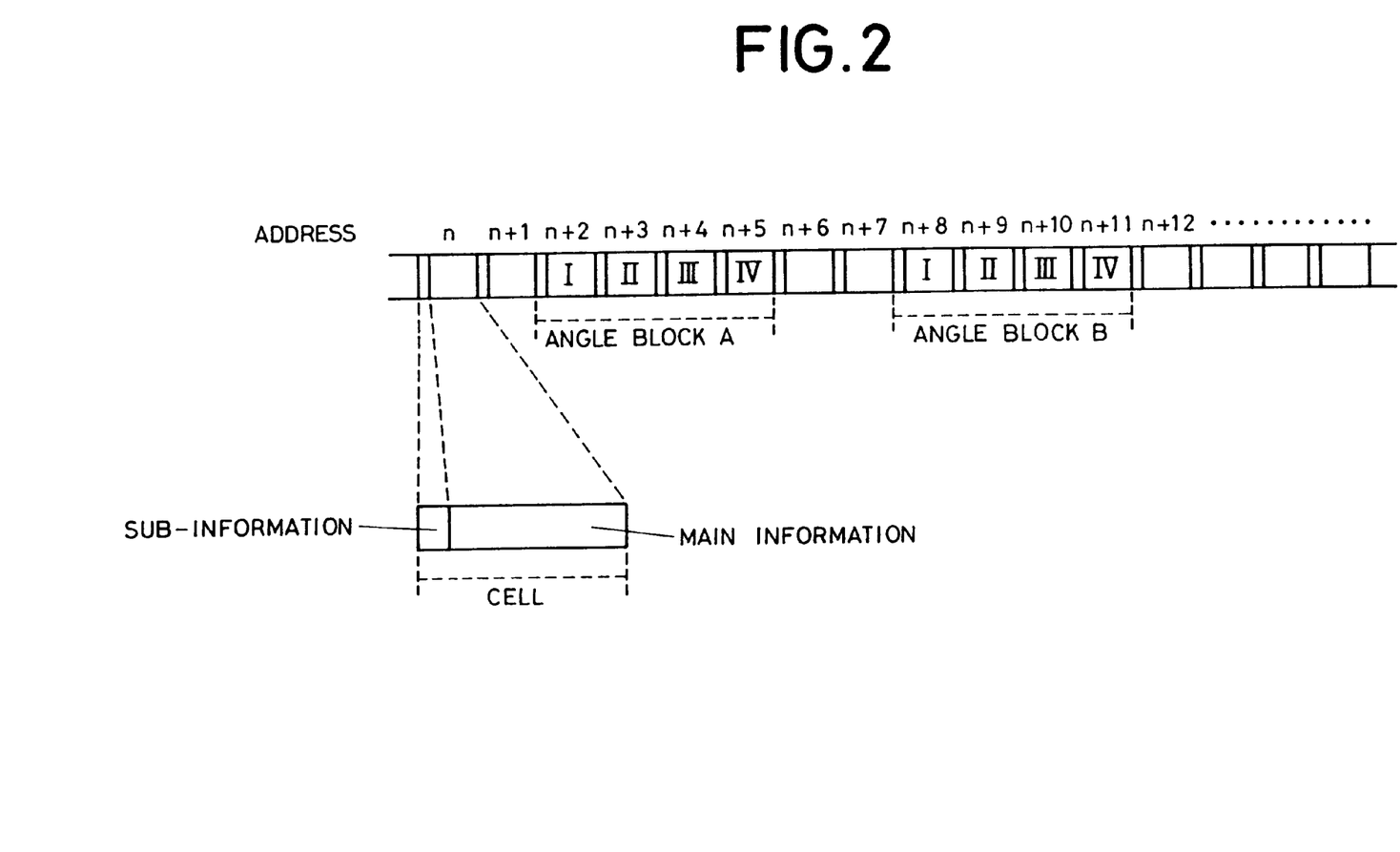
FIG. 2 is a diagram schematically showing a part of information contents carried by an optical disk having angle blocks, which is to be played in a recording medium playing apparatus according to the present invention.

The data recording structure of the optical disk 1 will be described at first. As depicted in FIG. 2, the optical disk 1 carries information in the form of a plurality of cells each of which constitute an information unit of main and sub-information pieces which corresponds to a certain time position in the time axis of reproduction.

The main information piece of each cell carries program information to be reproduced, such as audio data and video information corresponding to a time position on the time axis of reproduction. The sub-information piece of each cell, on the other hand, carries data such as address data of the cell itself and an angle block code. Furthermore, the sub-information piece in the angle block carries program management data to be used for the control of reproduction, such as the start address of a cell corresponding each angle number in each angle block. The addresses recorded in the sub-information pieces are determined to have consecutive values from an inner periphery of the recording area to an outer periphery thereof, so that they can be used for control operations such as the search of each information piece.

As shown in FIG. 2 which schematically shows a part of data contents carried by the optical disk 1, data is read from the optical disk 1 in such a manner that cells, each serving as a unit of information and constituted by a part of main information pieces and a part of sub-information pieces, are successively retrieved from the optical disk 1. The video and audio data on the disk is obtained by continuously reproducing video data held in the part of the main information pieces which constitute each cell. In this scheme, a plurality of cells at a part of the consecutive cells together constitute an angle block.

The term "angle block" denotes a group of information pieces of the same time constituted by a plurality of cells corresponding to the same instant on the time axis of the information on the disk. For instance, if the information recorded on the disk is of a baseball game, views of a scene showing the point of the game, such as a home-run scene, in a plurality of directions are taken from behind of the pitcher, from behind of the catcher, and so on, and the video information pieces representing such views are held by a plurality of cells which constitute an angle block. In FIG. 2, for example, if the angle block indicated by the sign "A" is a home-run scene, the angle block can be formed such that its angle number "I" denotes a cell holding video information corresponding to a view of the home-run scene from behind of the pitcher, its angle number "II" denotes a cell holding video information corresponding to a view of the home-run scene from behind of the catcher, and so forth. In FIG. 2, one angle block is constituted by four cells corresponding to angle numbers "I" through "IV", respectively.

As explained above, the information carried by each of the cells in the angle block is a combination of preliminary information pieces for a so called alternate reproduction of one scene which are prepared to enable a reproduction operation allowing, when reproducing information on the disk along the time axis, the replacement of video and audio information pieces of a certain time period with other various video and audio information pieces. Depending on the information contents of the disk, a plurality of angle blocks are prepared so as to correspond to a plurality of different time zones in the information reproduction time, and each of the angle blocks is prepared to allow displaying of various views in a predetermined time zone in the reproduction time axis. In the example depicted in FIG. 2, there are shown two angle blocks A and B. When reproducing each of the angle blocks A and B during the play of the optical disk 1 along the time axis as depicted in FIG. 4, one of four views is selectively reproduced in accordance with the angle number.

Figure 4:
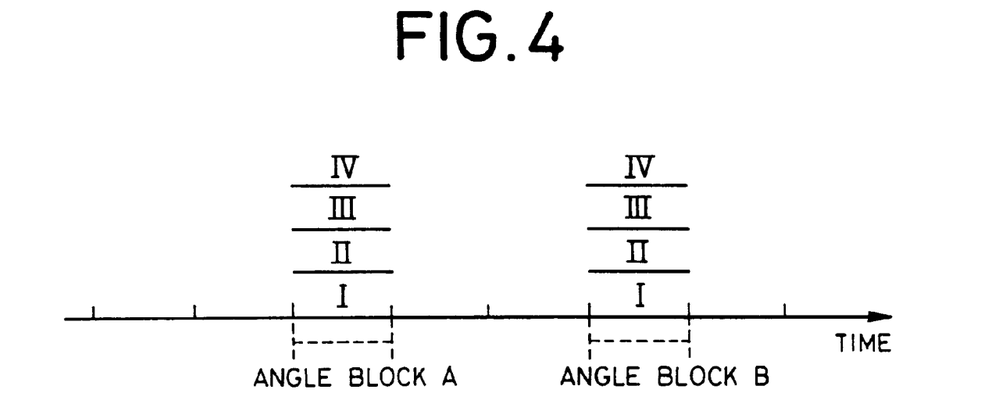
FIG. 4 is a schematic diagram showing the arrangement of information pieces of the disk, showing information pieces carried by the optical disk having angle blocks, arranged along a time axis, to be used in the reproduction by the recording medium playing apparatus according to the present invention.

FIG. 4 schematically shows the arrangement of the information carried by the optical disk 1, that is, the information pieces arranged on the disk along the time axis.

Besides, a management data area is formed in a predetermined recording area of the optical disk 1, so that management data such as data related to each of angle block codes, and a reproduction start address of each angle block, are recorded therein.

In the management information area, there also recorded is one or more control data piece for designating a reproduction order of cells or angle blocks which are selected from among the whole cells and angle blocks recorded on the disk.

The control data is used, for example, in the following case. That is, if a movie or the like is recorded on the disk, a plurality of control data pieces respectively corresponding to a plurality of reproduction versions are recorded in the management information area. The reproduction versions include a complete version to reproduce a movie without any cut, a cut-out version to reproduce the movie with some of unimportant scenes cut off, a highlight version to successively reproduce short highlight scenes which forms the points of the movie, and so on.

By adopting a scheme that these control data pieces are previously read in the reproduction apparatus or the like, the reproduction apparatus can, for example, be devised that titles of the prepared reproduction versions are displayed on a display device, so that the user can select a desired reproduction version to perform a reproduction process, according to the desired reproduction version, of the recorded movie.

The structure of the recording medium reproduction apparatus will be explained next.

In FIG. 1, the reference numeral 2 denotes a pickup which reads a signal from the optical disk 1 and supplies it to a first demodulation part 3. The first demodulation part 3 executes processes such as a de-interleaving and an error correction on the signal being supplied, to produce a reproduction digital signal. The reproduction digital signal is in turn supplied to a first memory part 4 in which the supplied digital signal is stored. The reproduction digital signal contains signals corresponding to the main and sub information and management information described before.

Among the signals contained in the reproduction digital signal stored in the first memory part 4, the audio information signal is supplied to an audio demodulating part 5 under a control of a CPU (Central Processing Unit) 7 of a microcomputer, for example. The audio information signal is demodulated by the audio demodulation part 5, and outputted as a predetermined audio signal. The video information signal is supplied to a video demodulating part 6 under a control of the CPU 7, demodulated at the video demodulating part 6, and outputted therefrom as a video signal. Besides, the sub-information signal and management information signal are supplied to the CPU 7, and used for various control operations such as the control of a servo controller 8.

The reproduction apparatus is designed that the data reading rate from the disk is higher than the data transfer rate from the first memory part 4 to the audio demodulation part 5, and to the video demodulating part 6. This allows reproduction information pieces to be outputted from the output end of each circuit element without interruption even when the read-out of information from the disk is temporarily interrupted, for example, by a search operation of the pickup 2.

The CPU 7 has an input part 9 connected thereto, so that through this input part 9 the CPU 7 receives various commands for various operations, such as the designation of a reproduction mode, such as a normal reproduction, an angle designated reproduction, an angle random reproduction, an all angle reproduction, and a highlight angle reproduction, which will be described later, and the designation of an angle block code and the designation of the angle number at the time of the designation of an angle reproduction mode.

Figure 3:
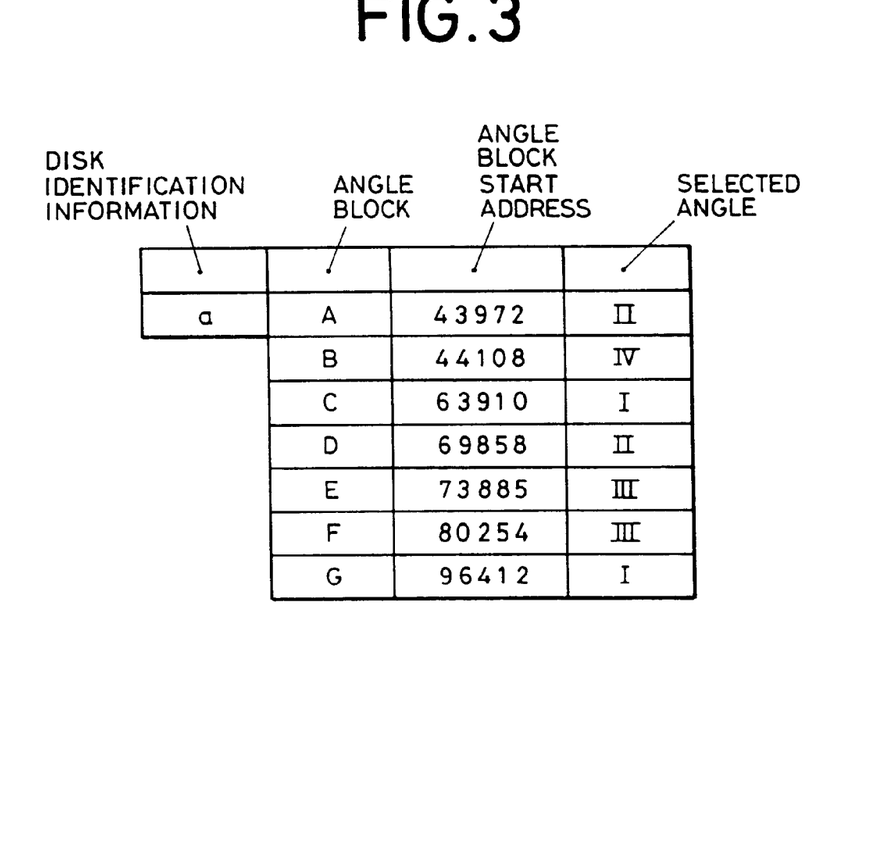
FIG. 3 is a diagram showing an example of a table stored in a second memory part in the apparatus according to the present invention.

A second memory part 10 is provided by forming a memory table by using RAM, so that data corresponding to the disk identification information of the optical disk 1, the angle block code, the start address of the angle block, and the angle number, are stored in a manner that the data pieces are correlated to each other as illustrated in FIG. 3, based on the incoming sub-information signal and the management information signal. The disk identification information is provided to identify the optical disk, a predetermined information piece in the management information area is used for that purpose, and recognized by the CPU 7.

FIG. 3 shows a example of the table stored in the second memory part 10, in which data pieces comprised of a part of information within the disk as disk identifying information, a couple of data pieces consisting of a start address and a selection angle number designated by the user, for each of angle blocks are stored for each disk. The second memory part 10 is formed to store a plurality of tables so that the apparatus can handle information pieces of a plurality of disks.

The first embodiment of the recording medium reproducing apparatus according to the present invention has the above-described structure, so that information is read from the optical disk, to produce audio and video information based on the command set via the input part.

Operations of various parts of the recording medium reproducing apparatus shown in FIG. 1 during the play of the optical disk 1 to perform a normal reproduction operation or an angle designation reproduction operation will be described hereinafter.

Firstly, the normal reproduction operation will be explained in detail.

Referring to FIG. 1, assume that the normal reproduction mode command is supplied to the CPU 7 from the input part 9 after the disk 1 is put on a tray of a disk transporting mechanism (not shown in the figure) of the recording medium reproducing apparatus and loaded into the inside of the apparatus. In response to this command, the CPU 7 initiate the control of the servo controller 8 to start reading of the signal in the management information area of the disk by the pickup 2. The signal retrieved by the pickup 2 is supplied to the first demodulating part 3, and the first demodulating part 3 in turn generates a management information signal which is formed by the reproduction digital signal corresponding to the management information on the disk. The management information signal being generated is then temporarily stored in the first memory part 4 and also supplied to the CPU 7.

The CPU 7 in turn detects as to whether or not an information piece relating to an angle block is present in the management information signal being supplied. The detection is performed by means of detection means (not shown) which the CPU 7 has, and the detection is made as to whether or not the disk being played has an angle block, by detecting the presence of information pieces relating to the angle block code or the reproduction start address of each angle block, recorded in the management information area.

When it is detected that no angle block exists on the disk, the CPU 7 consecutively transfers the main information pieces stored in the first memory part 4 to the audio demodulation part 5 or the video demodulating part 6 in parallel with the reading of the information by the pickup 2, to produce an audio signal or a video signal and to output the signal being produced.

When, on the other hand, it is detected that an angle block exists on the disk, the CPU 7 consecutively performs the reproduction of the cells other than the angle block. With respect to the cells forming the angle block, the CPU 7 controls the pickup 2 to read only one of those cells. More specifically, in the case of a series of data pieces shown in FIG. 2, for example, only the first one of the cells recorded in each angle block (the cells corresponding to I of the angle block A and I of the angle block B) is reproduced.

Therefore, in the case of the data pieces shown in FIG. 2, the cells carrying information are reproduced in an order of addresses n, n+1, n+2, n+6, n+7, n+8, n+12 . . . . For this reading operation, the CPU 7 controls the pickup 2 to sequentially search for an address to be reproduced based on such information pieces as those relating to the angle block code recorded in the management information area, the reproduction start address of each angle block, the address of each cell recorded in the sub-information and the reproduction start address of the cell corresponding to each of the angle numbers in each angle block.

The normal reproduction operation is performed by the process described above. It is also possible to arrange the apparatus to control its operation in the following way. Namely, when the disk to be played by the normal reproduction operation has been previously played so that the table corresponding to that particular disk is already stored in the second memory part 10 and the angle number has been designated for each of the angle block, the CPU 7 plays the disk based on the data in the stored table. Also in such a case, it is possible to command a change of the angle number or a change of the angle block number arbitrarily during the reproduction operation in the manner as explained above.

Prior to the reproduction of the main information pieces in the disk, the CPU 7 compares the disk identification information retrieved from the disk with the disk identification information in the table stored in the second memory part 10, and performs the reproduction operation according to the corresponding table when a coincident disk identification information is detected.

The angle designation reproduction operation will be explained hereinafter.

The process of the angle designation reproduction operation can be summarized that, when reproducing the information of each angle block, the cell corresponding to a designated angle number is reproduced based on the angle number which is designated for each of the angle block. This process is performed by selecting the angle designation reproduction mode at the input part 9.

To designate an angle number for each of the angle blocks, the input part 9 is operated either before the play of the disk or during the reproduction operation. When functioning under the angle designation reproduction mode, If, the CPU 7 consecutively selects a cell corresponding to an angle number and reproduces the selected cell if such an angle number is stored for each angle block in a table in the second memory part 10 which corresponding to the disk being played.

Furthermore, the angle number can be arbitrarily designated for each of the angle block through the input part 9. It is also possible to adopt an arrangement that a certain angle number is uniformly designated for all of the angle block codes. More specifically, as illustrated in FIG. 3, one of angle numbers I through IV can be arbitrarily selected for each of the angle block codes A through G. On the other hand, it is possible to designate one angle number (for example, I) uniformly for all of the angle block codes A through G, and to store it in the table.

As illustrated in FIG. 2, if a uniform designation of angle number is performed through the input part 9 when the angle block A of the disk is being reproduced, the same angle number is stored in a table in the second memory part 10 corresponding to the disk, as the angle number for each of the angle block code, at blanks of selected angle. For the angle blocks after the angle block B, reproduction of the angle block is performed according to the stored angle number.

In addition, the apparatus is devised to display in a display device connected to the apparatus (not shown in the figure) a message for previously notifying the reproduction of the angle block from a predetermined time before the reproduction of each angle block. By performing the designation of angle during this display time, it is possible to designate the angle number for a particular angle block each time the reproduction of the angle block is performed.

Assume that, when a message for previously notifying the reproduction of the angle block A is displayed in the display device, and the user has designated the angle number II through the input part 9, the cell at the address n+3 shown in FIG. 2 is reproduced in the angle block A, and data corresponding to the angle number II is stored as the selected angle for the angle block A in the table corresponding to the disk being played in the second memory part 10 shown in FIG. 3. If the angle IV is designated at the display time prior to the angle block B, the cell at the address n+11 is reproduced, and data corresponding to the angle number IV is stored as the selected angle for the angle block B in the table as in the case of the angle block A. In this way, a similar operation is consecutively performed in each of the angle blocks, and the table corresponding to the disk which has been played is renewed and maintained in the second memory part 10.

Furthermore, during the reproduction of the cell in an angle block, if the user wishes to switch for reproduction among the cells corresponding to other angle numbers in the same angle block, switching to the specific cell can be performed by designating the desired angle number through the input part 9, so that the reproduction of the corresponding cell is performed. In this scheme, since the start addresses of all cells in the angle block are stored in the sub-information so that they correspond to the angle numbers of those cells, for each of the cells in the angle block, when the angle number is designated the CPU 7 performs a control operation of the servo controller 8 to drive the pickup 2 to directly read the start address of the designated cell.

Furthermore, during the reproduction of the cell in a certain angle block if the user wishes to reproduce another angle block, in response to the designation of the desired angle block code by the user through the input part 9, the CPU 7 performs the control of the servo controller 8, to cause a search operation of the pickup 2 to search for a start address of the angle block of the designated code, and to drive the pickup 2 to reproduce a cell corresponding to the angle number stored for the designated angle block.

The user is also allowed to previously designate the angle numbers of the angle blocks through the input part 9 prior to the start of the reproduction of information of the disk. In the case of such an operation, the selected angle numbers are stored in the table in the second memory part 10 by the CPU 7 in the manner that the angle numbers are stored together with the disk identification information, angle block code, and angle block start addresses so that the angle numbers respectively correspond to the angle blocks.

If, on the other hand, the designation of the angle numbers is not performed prior to the start of the reproduction, the CPU 7 forcibly selects, in the table corresponding to the disk being played stored in the second memory part 10, an angle number corresponding to the cell recorded at the head position of an angle block for angle block codes to which the designation of the angle number has not been made.

Hence, during the play of the disk, also for the angle blocks to which the angle number is not designated by the user a message for previous notification is displayed, from a predetermined time before the reproduction of the angle block, indicating that the angle number corresponding to the cell recorded at the head part of the particular angle block. In such a case, by the designation of another angle number through the input part 9, reproduction will be performed according to the angle number designated lastly.

As explained specifically, in the first embodiment according to the first aspect of the invention, reproduction of cells is performed according to the stored angle number if an address for which the angle block code is recorded is detected during the reproduction operation.

Now, the second aspect of the present invention will be described by way of the second embodiment with reference to the drawing.

Figure 5:
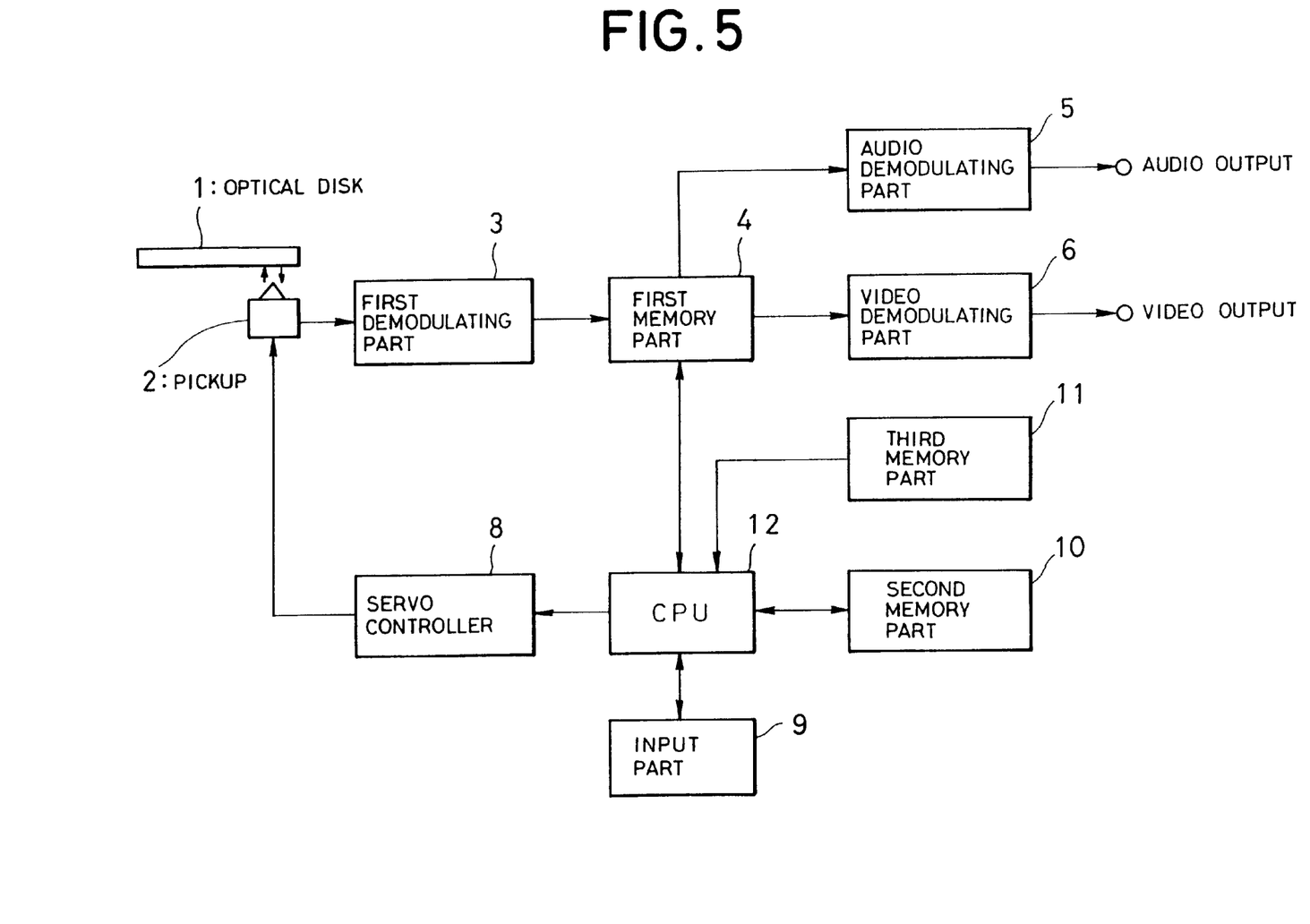
FIG. 5 is a block diagram schematically showing major parts of a second embodiment of the recording medium playing apparatus according to the present invention.

FIG. 5 is a block diagram schematically showing the major parts of the second embodiment of the recording medium playing apparatus according to the present invention.

In FIG. 5, the same elements as those shown in FIG. 1 or like parts are denoted by the same reference numerals and the explanation thereof will not be repeated. In the second embodiment, the apparatus includes a CPU 12 and the CPU 12 has the same control functions as those of the CPU 7 explained with reference to FIG. 1, and further has the following function. That is, if the order of reproduction of the cells (information pieces) or angle blocks carried by a disk is previously set in association with the identification information of the disk, the CPU 12 stores data corresponding to the reproduction order of the cells (information pieces) or angle blocks, which has been previously set, into a third memory part 11.

When the reproduction order of the cells (information pieces) or angle blocks is stored in the third memory part 11, the CPU 12 reads out, according to the identification information of the disk, the reproduction order of the cells (information pieces) or angle blocks of that particular disk and performs a control operation for the reproduction according to the reproduction order read out from the third memory part 11.

Prior to the reproduction of the main information pieces in the disk, the CPU 12 compares the disk identification information retrieved from the disk with the disk identification information in the table stored in the second memory part 10, and if those disk identification information pieces coincide, performs the reproduction operation according to the table corresponding to that disk identification information.

The determination of the reproduction order of the information pieces is performed as follows. If, for example, the user wishes to choose some angle blocks from among a plurality of angle blocks and reproduce the selected angle blocks in a different order, it is needed for the user to select the angle block codes of the angle blocks which the user wishes to reproduce, and to enter the angle block codes through the input part 9 in a reproduction order which the user wishes. In response to the user input, the CPU 12 performs a control operation that data of the selected angle blocks are stored in the third memory part 11 in the order of the input, and the selected angle blocks are consecutively read out in response to an angle set reproduction mode command from the input part 9. Then, based on the table stored in the second memory part 10, the CPU 12 performs a control operation to reproduce cells corresponding to angle numbers each stored for each of the angle blocks which are consecutively read-out.

Furthermore, as described before there is a case that all of the cells and angle blocks or some of them are previously selected from among all of the cells and angle blocks recorded on the disk, one or more control data piece designating the reproduction order of the selected cells and/or the angle blocks is stored in the management information area of the optical disk 1, and one of the control data piece(s) is selected by the user through the input part 9. In such a case, the CPU 12 performs a control operation to store data of the cells and angle blocks into the third memory part 11 together with their order of reproduction, based on control data selected from those read-out from the management information area.

Then, the CPU 12 performs a control operation to consecutively reproduce the cells and/or angle blocks stored in the third memory part 11. In this state, if the angle number is stored in the memory table of the second memory part 10 for the angle blocks stored in the third memory part 11, then the CPU 12 performs a control operation to reproduce the angle blocks using the cells of the corresponding angle number.

It is possible to arrange the apparatus such that if, on the other hand, angle numbers are not stored in the memory table of the second memory part 10 for the angle blocks stored in the third memory part 11, the CPU 12 for example uniformly sets the angle number corresponding to the cell at the head position of the angle block and stores the set angle number in the second memory part 10. It is also possible to arrange the apparatus that if there is an angle number initially set in the control data, then the CPU 12 sets the angle number to the initial angle number and to store it in the memory table in the second memory part 10.

It is recognized that the information carried by the cells of each angle block are often those constituting a highlight scene. Therefore, by consecutively selecting the cells mainly from those of the angle blocks, highlight scenes of the disk being played can be easily reproduced. It is also possible to adopt such an arrangement that results of the selection of these angle blocks and cells are previously stored in the third memory part 11 together with the disk identification information by the CPU 12, and the angle blocks and the cells are consecutively read-out for reproduction when a highlight angle reproduction mode command is received from the input part 9.

More specifically, the selection and setting of the cells and/or the angle blocks are performed such that, in the case of the series of the cells shown in FIG. 2, the reproduction order in the normal reproduction mode will be "n, n+1, angle block A, n+6, n+7, angle block B, n+12, . . . ", and the reproduction order in the highlight scene reproduction mode will be "n, angle block A, n+7, angle block B, . . . ".

Furthermore, if the reproduction order of the cells and/or angle blocks is stored in the third memory part 11, the CPU 12 then performs a control operation so that an angle number corresponding to that in the normal reproduction operation described above is initially set and stored into the table in the second memory part 10 as the angle number for each angle block code. It is also possible to adopt an arrangement that the angle number of each angle block in the highlight angle reproduction mode is respectively set through the input part 9.

In the case of such an arrangement, the angle number of each angle block which has been set respectively is stored in the table in the second memory part 10 so that it corresponds to each angle block code.

The angle number of each angle block being set initially may be, as described above, uniformly set to be an angle number corresponding to the cell recorded at the head position of each angle block. Otherwise, the angle number may be set as a number corresponding to another cell in the angle block.

In the first and second embodiment described above, the disk to be played is identified by using disk identification information, and the table stored in the second memory part 10 corresponding to each disk is utilized for various control operations. However, it is also possible to employ an arrangement without using the disk identification information. In such a case, it can be arrange the apparatus that the table in the second memory part 10 is used generally for each of the disks, the table is made valid when a predetermined disk is loaded, and the contents of the table are erased when the disk is ejected by the loading mechanism (the carrying tray is opened). In this case, it is possible to arrange the apparatus that only one table is prepared in the second memory part 10.

The recording medium playing apparatus according to the third aspect of the present invention will be explained by way of the third embodiment with reference to the drawing.

Figure 6:
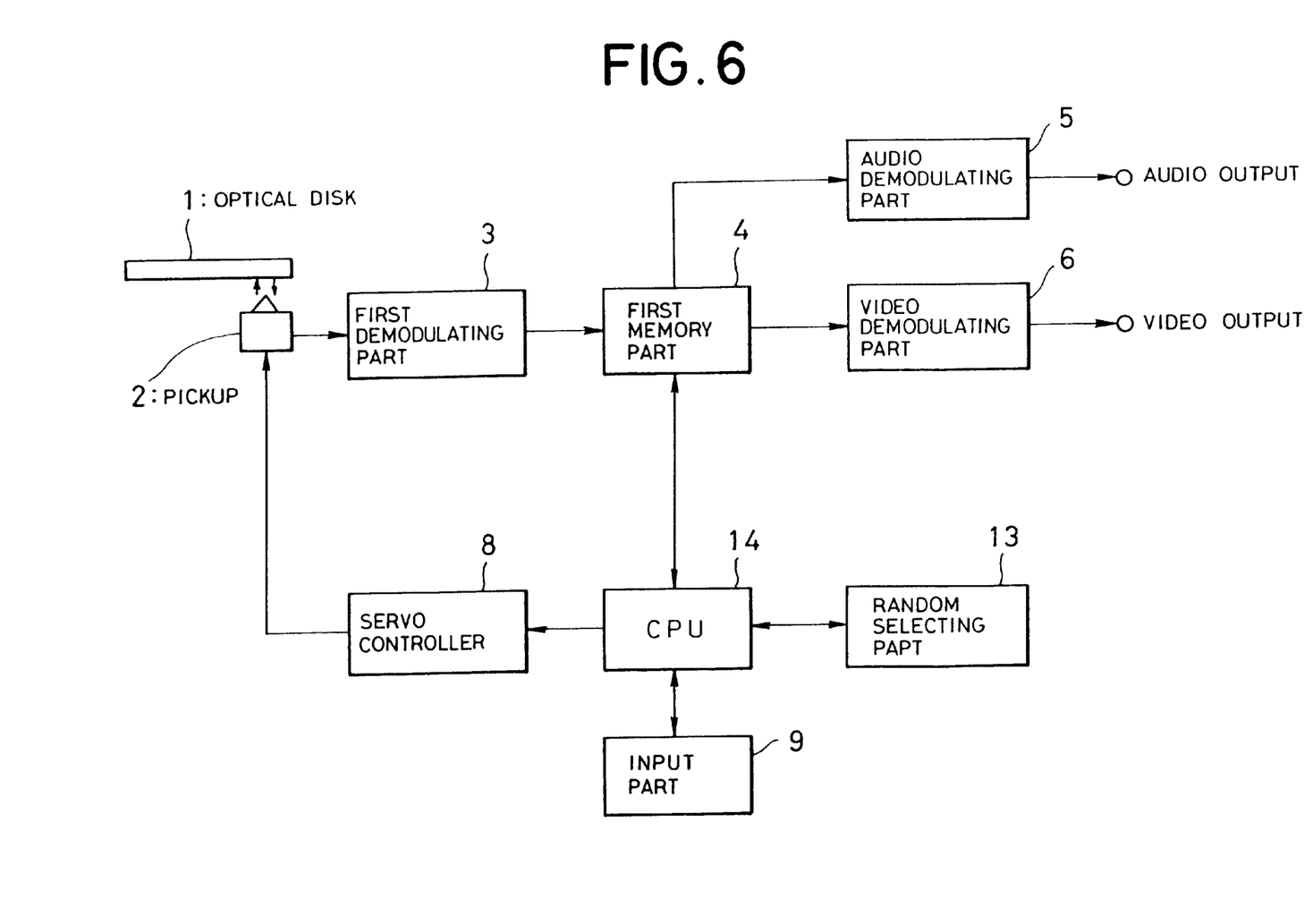
FIG. 6 is a block diagram schematically showing major parts of a third embodiment of the recording medium playing apparatus according to the present invention.

FIG. 6 is a block diagram schematically showing the major parts of the third embodiment of the recording medium playing apparatus according to the present invention.

In FIG. 6, the same elements as those shown in FIG. 1 and FIG. 5 or like parts are denoted by the same reference numerals and the explanation thereof will not be repeated. In the third embodiment, the apparatus is arranged that, when reproducing information recorded on the disk, the angle number is randomly selected in each angle block in accordance with a random number produced by a random selecting part 13, and the cell corresponding to the selected angle number is reproduced.

The operation of the apparatus in the third embodiment will be particularly described below.

When a random angle reproduction mode is designated through the input part 9, a CPU 14 provided in the apparatus performs control operations similar to those performed by the CPU 7 previously explained, so that the reproduction of the information pieces on the disk is started and the cells on the disk are consecutively reproduced. In this state, when the CPU 14 detects angle blocks based on the address information recorded on the disk, it selects one information piece from among the angles of each of the angle blocks according to a random number generated from the random selecting part 13. According to the management information, the CPU 14 recognizes the address of the selected cell, and sends a command to the servo controller 8 to cause the pickup 2 to search for the corresponding address. Afterwards, reproduction of each cell on the disk other than those in angle blocks, and each angle block is consecutively performed by repeating this type of operation.

The recording medium playing apparatus according to the fourth aspect of the present invention will be explained by way of the fourth embodiment with reference to the drawing.

Figure 7:
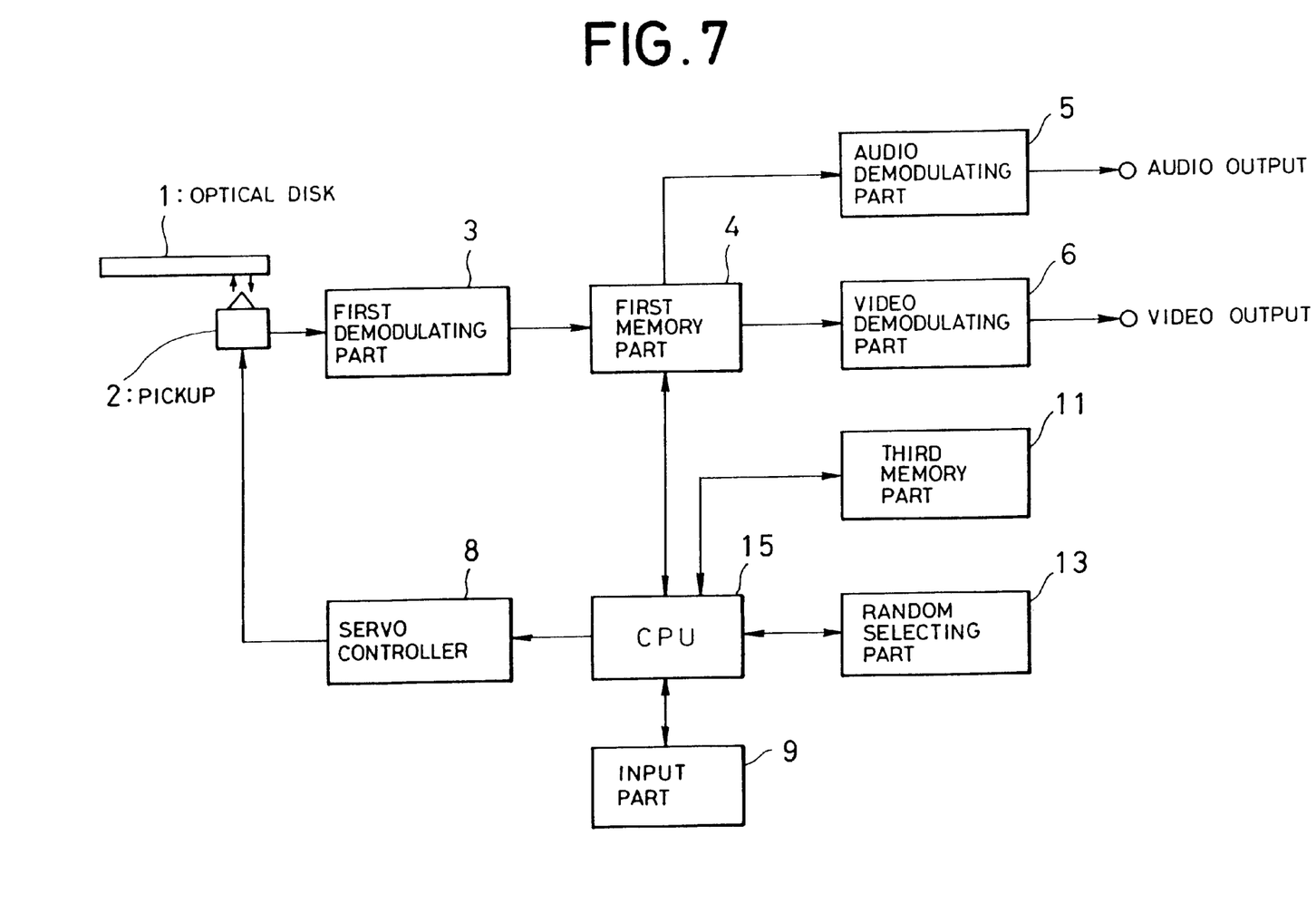
FIG. 7 is a block diagram schematically showing major parts of a fourth embodiment of the recording medium playing apparatus according to the present invention.

FIG. 7 is a block diagram schematically showing the major parts of the fourth embodiment of the recording medium playing apparatus according to the present invention.

As shown in FIG. 7, the third memory part 11 is added to the elements of the third embodiment of the recording medium playing apparatus shown in FIG. 6.

In the fourth embodiment, the apparatus includes a CPU 15 which has control functions similar to those of the CPU 14 shown in FIG. 6 and further has a function that when the reproduction order of the cells (information pieces) or angle blocks carried by a disk is previously set in association with the disk identification information of the disk, it stores the data relating to the reproduction order into the third memory part 11. When the reproduction order of the cells (information pieces) and/or angle blocks is stored in the third memory part 11, the CPU 15 performs control operations to read-out the reproduction order of the cells (information pieces) on the particular disk to be stored in the third memory part 11 based on the disk identification information of the disk, and to reproduce the cells based on the read-out reproduction order.

The reproduction order of the information pieces is set, for example, in the following manner. When the user wishes to select only angle blocks and to reproduce the selected angle blocks in a different order, it is required for the user to select the angle block codes of the angle blocks which the user wishes to reproduce, and to enter the angle block codes through the input part 9 in an order of reproduction in which the user wishes to reproduce the selected angle blocks. The CPU 15 then performs control operations to store data of the selected angle blocks into the third memory part 11 according to the selection order of those angle blocks. In response to the command of an angle set reproduction mode through the input part 9, the selected angle blocks are consecutively reproduced.

As described before, there is a case that some cells and or angle blocks are selected from among all of the cells and angle blocks recorded on the disk and one or more pieces of control data for designating the order of reproduction of those cells or angle blocks is stored in the management information area of the disk 1. In such a case, if the user selects one of the control data pieces through the input part 9, the CPU 15 performs a control operation to store data of the cells and/or the angle blocks into the third memory part 11 together with data relating to the reproduction order thereof, based on the control data selected from the control data pieces read-out from the management information area.

The CPU 15 then performs a control operation to consecutively reproduce the cells and/or angle blocks whose data is stored in the third memory part 11. If each angle block is to be reproduced, the CPU 15 selects one information pieces (cell) from among angles in each angle block according to a random number generated by the random selecting part 13. The CPU 15 recognizes the address of the selected cell through the management information, and transmits a command to the servo controller 8 so that the corresponding address is searched for by the pickup 2. Afterwards, by repeating this operation, it is enabled to reproduce the cells of the disk other than those in the angle blocks, and the cells corresponding to an angle number in each angle block, which has been randomly selected, following an order designated by the selected control data.

For each of the read-out angle block, the CPU 15 selects one information piece (cell) from among the angles of the angle block based on the random number generated by the random selecting part 13. The CPU 15 recognizes the address of the cell from the sub-information which the selected cell carries, and transmits a command to the servo controller 8 so that the corresponding address is searched for by the pickup 2. Afterwards, by repeating this operation, the cells other than those in the angle blocks, and the angle blocks carried by the disk are consecutively reproduced.

Furthermore, it is often the case that the information carried by the cells in each angle block constitute a highlight scene of the information of the disk. Therefore, highlight scenes of the disk can be readily reproduced by consecutively selecting the cells mainly from among those in the angle blocks. The selection of these angle blocks and the cells is performed in such a way that the CPU 15 previously store data of those angle blocks and the cells into the third memory part 11 together with the identification information of the disk. By designating the highlight angle reproduction mode through the input part 9, the angle blocks and the cells are consecutively reproduced.

If the information recorded on the optical disk 1 is video information, the order of reproduced images becomes different each time the reproduction is performed by the random angle reproduction operation which has been explained by way of the third and fourth embodiments. By this feature, the user can enjoy an unexpected reproduction of scenes during the playback of the disk.

The recording medium playing apparatus according to the fifth aspect of the present invention will be explained by way of the fifth embodiment with reference to the drawing.

Figure 8:
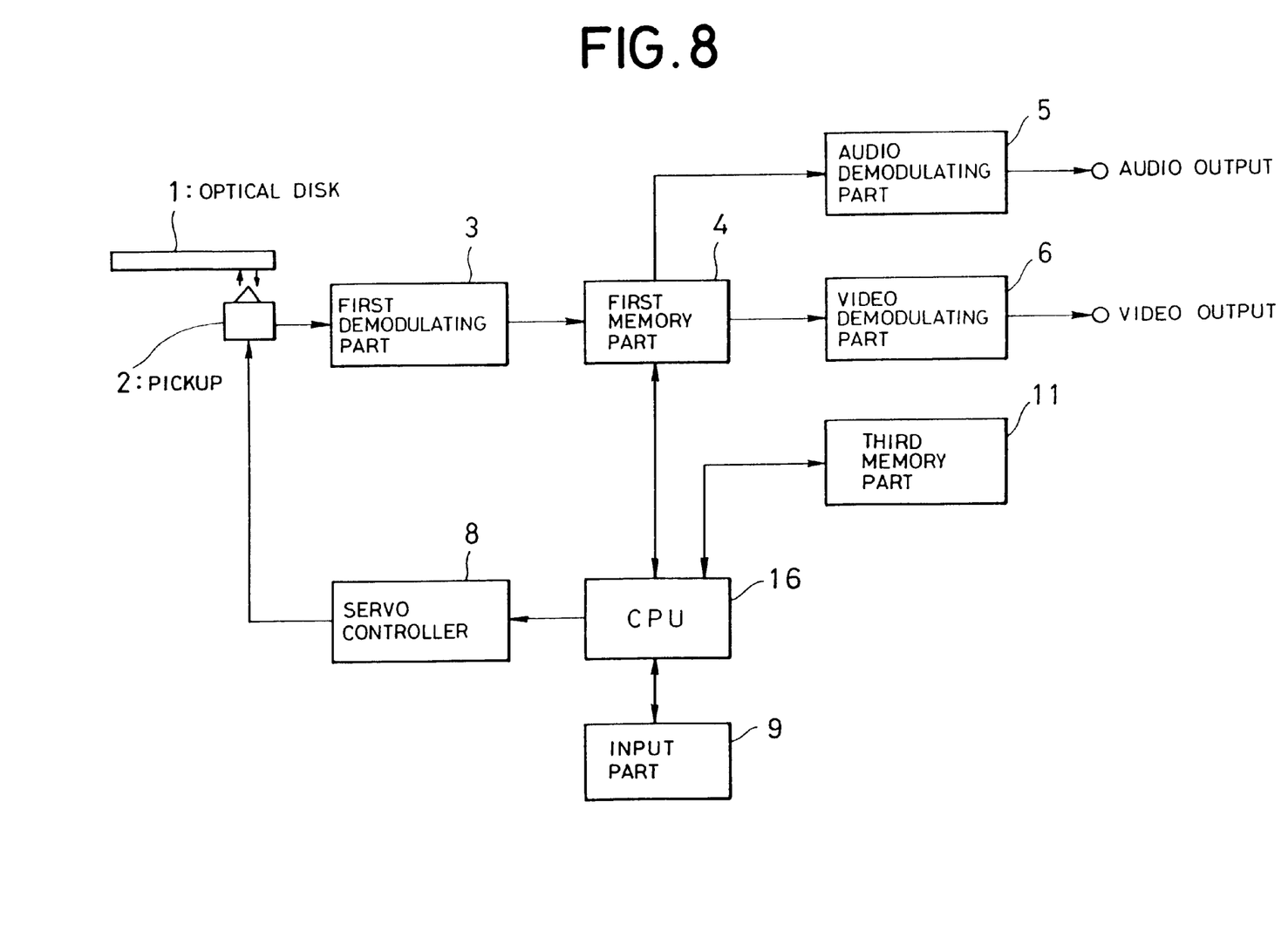
FIG. 8 is a block diagram schematically showing major parts of a fifth embodiment of the recording medium playing apparatus according to the present invention.

FIG. 8 is a block diagram schematically showing the major parts of the fifth embodiment of the recording medium playing apparatus according to the present invention.

In FIG. 8, elements of the recording medium playing apparatus illustrated therein that are the same or similar to those depicted in FIG. 1 are indicated by the same reference numerals, and the explanation thereof will not be repeated herein for the purpose of simplicity. In the fifth embodiment it is characterized in that all of the information pieces included in each angle block are reproduced when reproducing each of the angle blocks of the disk.

In FIG. 8, the apparatus includes a CPU 16 which has control functions similar to those of the CPU 7 explained with reference to FIG. 1, and further performs a control function that, if it detects the entry of an all angle reproduction command upon receipt of the all angle reproduction command through the input part 9, it controls the pickup 2 to reproduce all of the cells (information pieces) constitute each angle block when reproducing each of the angle blocks of the disk 1. If, on the other hand, the CPU 16 does not detects the entry of the all angle reproduction command, it controls the pickup 2 to reproduce one information piece from the angle block.

More specifically, if the input part 9 produces a normal reproduction mode command or an angle designation reproduction mode command designating the angle number I, the cells will be reproduced in an order of "n, n+1, n+2, n+6, n+7, n+8, n+12, . . . " among the cells depicted in FIG. 2. If, on the other hand, an all angle reproduction mode command is produced, the cells will be reproduced in an order of "n, n+1, n+2, n+3, n+4, n+5, n+6, n+7, n+8, n+9, n+10, n+11, n+12, . . . ".

The recording medium playing apparatus according to the present invention has been explained by way of the first to fifth embodiments. It should be, however, noted that the embodiment of the present invention is not limited to those described in the foregoing. For example, the second memory part 10 may be connected to the CPU of the recording medium playing apparatuses depicted in FIGS. 6 through 8 so that pieces of data relating to the disk identification information, angle block codes, the angle number in each angle block, the start address of each angle block are stored to be associated to each other in accordance with the management information of the disk. In such a case, it may be devised that the CPU included in the apparatus has operational functions of the CPUs 7, 12, 15 and 16 in a complex manner.

In each of the embodiment described above, the information carried by the disk is reproduced by optically reading the disk 1 carrying the angle blocks by means of the pickup 2. The information recording medium to be played is, however, not limited to an optical disk. The recording medium playing apparatus according to the present invention can play any recording medium irrespective of the information recording method, so far as the recording medium has same-time information groups each formed by a plurality of information pieces of the same time position on the time axis of information. In such cases, it is only necessary that the pickup of the recording medium playing apparatus is configured according to a conversion scheme by which corresponding information pieces of the recording medium can be recovered.

Furthermore, as an example of the same-time information group, the data group obtained by shooting an object at a plurality of angles and recording the generated data was shown in the embodiments described. It is, however, needless to mention that those data group can also be obtained by drawing or representing pictures of the same object at a plurality of angles, for example, to generate animation pictures. Thus, the production of the same-time information group is not limited to the described example, and furthermore it is, for example, possible to adopt a configuration that a plurality of different scenes occurring at the same time are recorded.

As the recording medium playing apparatus according to the present invention is configured as described in the foregoing, the memory means stores a selected information piece for each of the same-time informtion group by specifying the information piece by means of the specifying data, and the reproducing means reproduces the information carried by the recording medium based on the specifying data in the memory means. By this feature, the information piece selection operation is facilitated for a recording medium in which recorded a plurality of information pieces variously representing a scene at the same time axis position during the reproduction of information.

Furthermore, by employing a selection means for randomly selecting the information pieces, a random-selection reproduction of the same-time information groups can be easily performed when playing the recording medium.

In addition, by arbitrarily entering a command for reproducing all of the same-time informtion groups through an input means, the control means can perform a control operation that, when reproducing the same-time information group, an information piece included in the same-time information group is reproduced if the command has not been entered, and all of the information pieces included in the same time-data group are reproduced if the command has been entered. By this feature, the selective reproduction operation of each information piece of the same-time information group is facilitated.

While the present invention has been described with reference to the preferred embodiments thereof, a variety of adaptations and modifications may be thought by those skilled in the art. It is therefore intended that all of such adaptations and modifications are encompassed in the scope of the present invention as defined in the appended claims.

What is claimed is:

1. A recording medium playing apparatus for playing a recording medium on which at least a same-time information group formed by a plurality of information pieces of a same time position is recorded, each of said plurality of information pieces representing an image of a scene viewed at a different viewing angle, comprising:

reproducing means for reproducing information recorded on said recording medium;

selecting means for randomly selecting a single information piece without user intervention from among the plurality of information pieces of said same-time information group, each information piece representing an image of a different viewing angle; and control means for controlling said reproducing means to reproduce an information piece selected by said selecting means when reproducing said same-time information group.

2. A recording medium playing apparatus as claimed in any one of claims 1 through 7, further comprising:

memory means for storing specifying data for specifying a selected information piece of said same-time information group, said memory means storing an identification information piece recorded on said recording medium and said specifying data in the form of a pair; and a comparing means for comparing an identification information piece retrieved from said recording medium with said identification information piece stored in said memory means, wherein said control means controls said reproducing means to reproduce information of said recording medium based on said specifying data stored in a pair including said identification information when a coincidence between said identification information pieces is detected by said comparing means.

3. An recording medium playing apparatus as claimed in claim 1, further comprising detection means for detecting said same-time information group, wherein said control means controls said reproducing means to reproduce said information piece selected by said selecting means when said same-time information group is detected by said detection means.

4. A recording medium playing apparatus as claimed in claim 3, further comprising setting means for setting an order of reproduction of information pieces recorded on said recording medium, said setting means is operative to set said information piece selected by said selecting means as an information piece to be reproduced in said same-time information group.

5. A recording medium playing apparatus as claimed in claim 1, wherein information recorded on said recording medium is image information, and information pieces included in said same-time information group are image information pieces obtained by shooting or representing a same object at a plurality of angles.

6. A recording medium playing apparatus as claimed in claim 3, wherein information recorded on said recording medium is image information, and information pieces included in said same-time information group are image information pieces obtained by shooting or representing a same object at a plurality of angles.

7. A recording medium playing apparatus as claimed in claim 4, wherein information recorded on said recording medium is image information, and information pieces included in said same-time information group are image information pieces obtained by shooting or representing a same object at a plurality of angles.

8. A recording medium playing apparatus for playing a recording medium on which same-time information groups each formed by a plurality of information pieces of a same time position are recorded, comprising:

reproducing means for reproducing information recorded on said recording medium;

input means for entering an all-cells command for reproducing all of the information pieces included in each of said same-time information groups; and control means for controlling said reproducing means to reproduce, when reproducing the same-time information groups, a single information piece included in each of said same-time information groups if said all-cells command has not been entered, and to reproduce, when reproducing the same-time information groups, all of the information pieces included in each of said same-time information groups without further command entry if said all-cells command has been entered.

9. The recording medium playing apparatus for playing a recording medium of claims 1 or 8, wherein the recording medium stores at least a same-time information group formed by a plurality of information pieces of a same time position, and stores specifying data for specifying a selected information piece for each of said same-time information group.

* * * * *